United States Patent
Vyas et al.

(10) Patent No.: US 10,936,372 B2
(45) Date of Patent: *Mar. 2, 2021

(54) MERGING SCALED-DOWN CONTAINER CLUSTERS USING VITALITY METRICS

(71) Applicant: Red Hat, Inc., Raleigh, NC (US)

(72) Inventors: Jay Vyas, Concord, MA (US); Huamin Chen, Westborough, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,935

(22) Filed: Aug. 12, 2019

(65) Prior Publication Data

US 2019/0361747 A1 Nov. 28, 2019

Related U.S. Application Data

(63) Continuation of application No. 15/308,633, filed on May 30, 2017, now Pat. No. 10,379,908.

(51) Int. Cl.
| | |
|---|---|
| G06F 9/46 | (2006.01) |
| G06F 9/50 | (2006.01) |
| G06F 9/48 | (2006.01) |
| G06F 11/30 | (2006.01) |
| G06F 9/455 | (2018.01) |

(52) U.S. Cl.
CPC ......... *G06F 9/5061* (2013.01); *G06F 9/4856* (2013.01); *G06F 9/5005* (2013.01); *G06F 9/5083* (2013.01); *G06F 11/3003* (2013.01); *G06F 11/3006* (2013.01); *G06F 11/3055* (2013.01); *G06F 9/45558* (2013.01); *G06F 9/48* (2013.01); *G06F 2201/865* (2013.01)

(58) Field of Classification Search
None
See application file for complete search history.

(56) References Cited

U.S. PATENT DOCUMENTS

| | | |
|---|---|---|
| 8,775,392 B1 | 7/2014 | Walker et al. |
| 8,849,759 B2 | 9/2014 | Bestler et al. |

(Continued)

OTHER PUBLICATIONS

Babu et al., Distributing Workloads and Management for the Cloud Networks, International Journal of Innovative Technology and Research, vol. 5, No. 1, Dec.-Jan. 2017, pp. 5468-5470.

(Continued)

*Primary Examiner* — Gregory A Kessler
(74) *Attorney, Agent, or Firm* — K&L Gates LLP

(57) ABSTRACT

A system for container migration includes containers running instances of an application running on a cluster, an orchestrator with a controller, a memory, and a processor in communication with the memory. The processor executes to monitor a vitality metric of the application. The vitality metric indicates that the application is in either a live state or a dead state. Additionally, horizontal scaling for the application is disabled and the application is scaled-down until the vitality metric indicates that the application is in the dead state. Responsive to the vitality metric indicating that the application is in the dead state, the application is scaled-up until the vitality metric indicates that the application is in the live state. Also, responsive to the vitality metric indication transitioning from the dead state to the live state, the application is migrated to a different cluster while the horizontal scaling of the application is disabled.

20 Claims, 5 Drawing Sheets

(56) References Cited

U.S. PATENT DOCUMENTS

| | | |
|---|---|---|
| 8,887,056 B2 | 11/2014 | Breternitz et al. |
| 2010/0049534 A1 | 2/2010 | Whitnah et al. |
| 2016/0330277 A1 | 11/2016 | Jain et al. |
| 2017/0093923 A1 | 3/2017 | Duan |

OTHER PUBLICATIONS

Conference Tracks Overview, retrieved from the Internet on May 3, 2017 (47 pages) Link: http://conference.learnquest.com/documents/Cloud_Directory.pdf.

Does Kubernetes consolidate containers/pods in order to minimize resource fragmentation?, retrieved from the Internet on May 3, 2017 (1 page) Link: https://stackoverflow.com/questions/35616343/does-kubernetes-consolidate-containers-pods-in-order-to-minimize-resource-fragme.

Clustering in Parallels Containers-Based Systems, copyright 1999-2010 Parallels Holdings, Ltd. (13 pages).

MERGING SCALED-DOWN CONTAINER CLUSTERS USING VITALITY METRICS

CROSS REFERENCES TO RELATED APPLICATIONS

This application is a continuation of and claims priority to and the benefit of U.S. patent application Ser. No. 15/608,633, filed on May 30, 2017, the entire content of which is hereby incorporated by reference.

BACKGROUND

Computer systems may run applications or services that are provided via a server or cloud. The applications or services can be developed and deployed as a single unit or as multiple units, such as a collection of microservices. Applications or microservices may run within containers, which may be run on physical or virtual machines. For example, containers may encapsulate a lightweight runtime environment for an application or a microservice. In microservice architectures, containers and their associated application instances are replicated on node clusters in order to scale applications to meet workload demands. Applications may be migrated to a new node cluster, such as on a new datacenter, in order to reallocate resources or to update hardware.

SUMMARY

The present disclosure provides new and innovative systems and methods for merging container clusters. In an example, a system includes a plurality of containers running one or more instances of an application, an orchestrator with a controller, a memory, and a processor in communication with the memory. The application runs on a cluster. The processor executes to monitor a vitality metric of the application in the cluster. The vitality metric indicates that the application is in either a live state or a dead state. Additionally, the processor executes to disable horizontal scaling for the application and scale-down the application until the vitality metric indicates that the application is in the dead state. Responsive to the vitality metric indicating that the application is in the dead state, the processor executes to scale-up the application until the vitality metric indicates that the application is in the live state. Also, responsive to the vitality metric indication transitioning from the dead state to the live state, the processor executes to migrate the application to a different cluster. The migration occurs while the horizontal scaling of the application is disabled.

In an example, a method includes monitoring, by at least one container, a vitality metric of an application of a plurality of applications in a cluster. The vitality metric indicates that the application is in either a live state or a dead state. Additionally, horizontal scaling is disabled for the application. A controller scales-down the application until the vitality metric indicates that the application is in the dead state. Responsive to the vitality metric indicating that the application is in the dead state, the controller scales-up the application until the vitality metric indicates that the application is in the live state. Then, responsive to the vitality metric indication transitioning from the dead state to the live state, the application is migrated to a different cluster. The migration occurs while the horizontal scaling of the application is disabled.

In an example, non-transitory machine readable medium stores code, which when executed by a processor, causes the processor to monitor a vitality metric of an application of a plurality of applications in a cluster. The vitality metric indicates that the application is in either a live state or a dead state. The processor disables horizontal scaling for the application and scales-down the application until the vitality metric indicates that the application is in the dead state. Responsive to the vitality metric indicating that the application is in the dead state, the processor scales-up the application until the vitality metric indicates that the application is in the live state. Responsive to the vitality metric indication transitioning from the dead state to the live state, the processor migrates the application to a different cluster. Additionally, the migration occurs while the horizontal scaling of the application is disabled.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
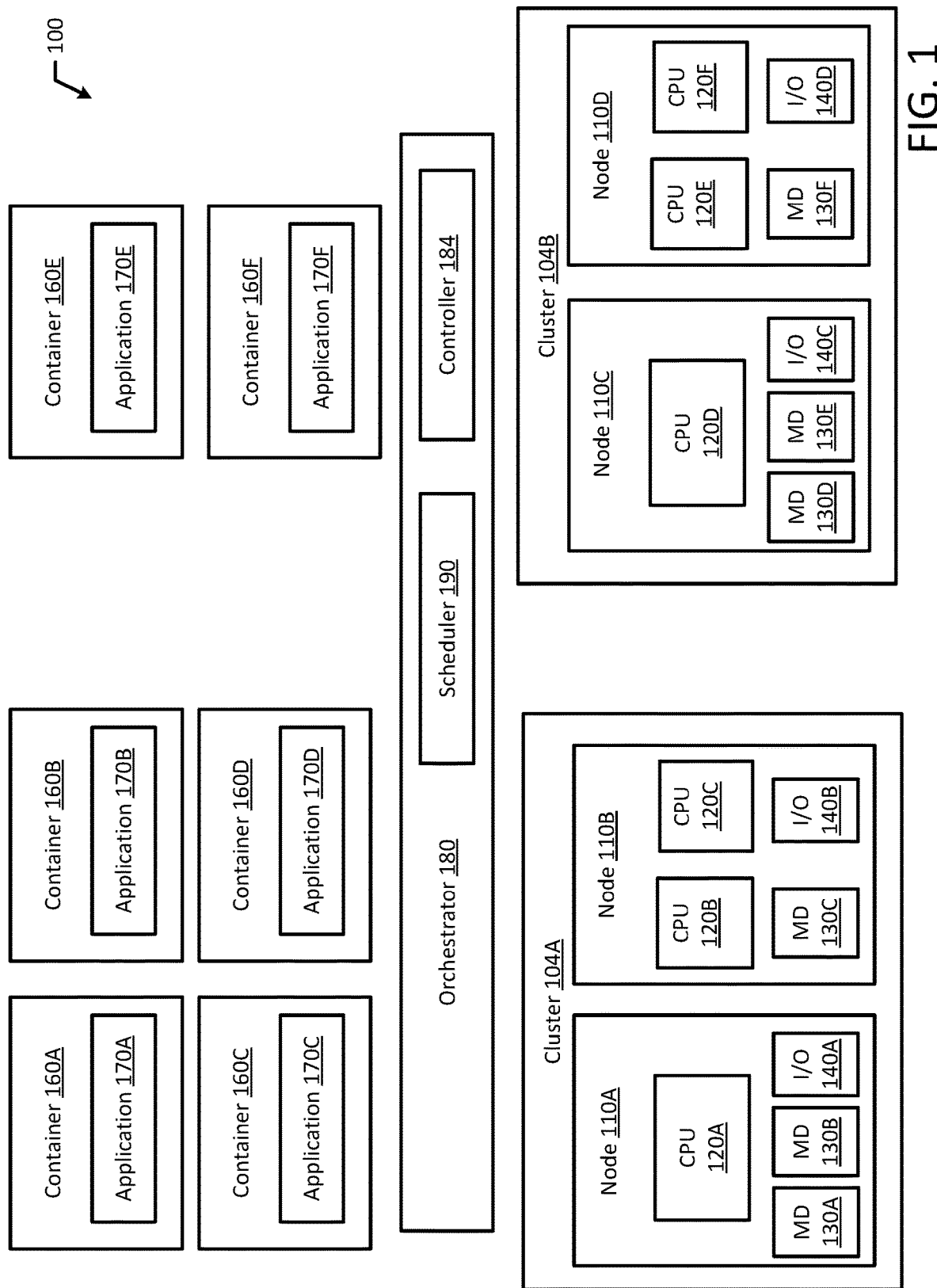
FIG. 1 illustrates a block diagram of an example container system according to an example embodiment of the present disclosure.

Techniques are disclosed for merging container clusters (e.g., node clusters executing containers). When applications (e.g., microservices) are running on a node cluster, application instances may be added to clusters by starting additional containers and/or pods on a computer system to scale certain services or aspects of an application. For example, as processes are scaled to meet increased demand from clients, containers running additional application instances are replicated on a node cluster and deployed to handle the increased load. Later, these applications may be migrated to new node clusters, for example, when updating to a new data center, reallocating resources, adding additional servers or hardware, taking old servers or hardware out of service, etc. Migrating each instance of an application to a new node cluster is typically time consuming and computationally expensive. For example, applications may have tens to hundreds of instances running on a node cluster, and the time to migrate the application may typically increase when more application instances are migrated. Additionally, each instance of the application may not be needed on the new cluster resulting in wasted time and resources spent migrating those instances. For example, applications may be artificially over-scaled on their current node cluster. Servers and datacenters with old or outdated hardware may result in network latencies, thereby requiring additional application instances to handle demand. Additionally, node clusters with different architectures may include additional application instances by design. Further, given that the applications may run more efficiently on the new cluster, each application instance running on the current cluster may be duplicative or unnecessary after migrating to the new cluster.

During migration, it may be beneficial to consolidate microservice clusters to reduce costs or consolidate infrastructure. For example, applications may be consolidated to less nodes or less node clusters before migration. However, scaling down large amounts of applications at one time may result in catastrophic failure of the microservices. For example, scaling-down applications too much may cause the applications to stop functioning correctly causing applications to freeze or crash resulting in down time.

To reduce time and costs associated with migration, applications may be scaled-down while monitoring a vitality metric for each application to find an optimum quantity of application instances for each application. For example, the vitality metric may indicate whether the scaled-down application is functioning correctly with a reduced number of application instances. Additionally, the applications are scaled-down with horizontal scaling of the application disabled, thereby preventing additional application instances from starting in new containers while each application is optimized. After each application has been optimized, the applications are migrated to a new cluster, perhaps on a new datacenter while horizontal scaling is disabled. Because each application has been optimized (e.g., minimum number of application instances for each application has been determined), typically, a reduced quantity of application instances are migrated to the new cluster, which advantageously saves time and computing resources. For example, by scaling-down applications to a reduced state, such as a minimum number of instances needed to run, the migration can be done quicker due to a reduced number of pods and/or containers that need to be migrated to a new cluster of nodes. Additionally, by scaling-down applications before migration, the present disclosure advantageously reduces the likelihood of migrating unnecessary or unneeded application instances to the new cluster thereby efficiently using the resources on the new cluster. After each application has been migrated, horizontal scaling is enabled for the applications to allow the applications to appropriately scale on the new cluster, thereby enabling application scaling according to the hardware, architecture, etc. of the new cluster. For example, some applications may run more efficiently on the new cluster and therefore may horizontally scale in a different manner than on the old cluster (e.g., scale a significantly lower amount).

FIG. 1 depicts a high-level component diagram of an example container system 100 in accordance with one or more aspects of the present disclosure. The container system 100 may include an orchestrator 180 and a scheduler 190 that implement application instances (e.g., applications 170A-F) on containers 160A-F on various clusters 104A-B of nodes 110A-D. As used herein, an application, referred to generally as application 170, may include several application instances (e.g., applications 170A-F). For example, application 170 encompasses all running application instances 170A-F.

Containers 160A-F may be treated as a single unit of deployment. Additionally, containers 160A-F may be organized in a pod. In an example, containers 160A-D may be organized in a pod and may be co-located on the same node (e.g., node 110A) or node cluster 104A. For example, containers 160A-D may share the same resources. For example, containers 160A-D may be located on cluster 104A and share the same resources, network, memory, and storage of the cluster 104A (e.g., CPU 120A-C, memory devices 130A-C, and input/output device(s) 140A-B). In an example, multiple containers (e.g., 160A-C) may be located on the same node (e.g., node 110A), while another container (e.g., container 160D) is located on its own node (e.g., node 110B). In another example, each container 160E and 160F may be located on its own node 110C and 110D respectively.

Containers 160A-F may execute applications or services, such as microservices. In an example, the containers 160A-F may each run a process or service and the containers 160A-F may be any execution environment. For example, the containers 160A-F may be a server, such as a virtual server. Additionally, containers 160A-F may be stand alone execution environments, similar to that of a virtual machine. For example, containers 160A-F may not be grouped or organized by tenants or into pods.

Containers 160A-F may monitor liveness or perform a liveness check on the application instance (e.g., application 170A) running within the container (e.g., container 160A). For example, liveness may be monitored by using a liveness probe to detect when an application 170 transitions into a broken state. For example, a liveness probe may detect an application deadlock, where an application instance is running, but unable to make progress. Additionally, containers 160A-F may monitor liveness at specified intervals. For example, a liveness probe may be performed every second, three seconds, five seconds, 30 seconds, etc. In an example, liveness is monitored by executing a command in the container 160. In one example, if the command succeeds, the command returns a "0" and the container (e.g., container 160A) and associated application instance (e.g., application 170A) may be considered to be alive and healthy. If a non-zero value is returned, the container 160A and associated application instance 170A may be considered broken, or dead.

In an example, a liveness probe may use an HTTP GET request. For example, if a liveness probe is conducted every five seconds, the HTTP GET request may be sent to the application instance 170A running in the container 160A. If the container 160A returns a success code, then the container 160A and respective application instance 170B is considered to be alive and healthy. Conversely, if the container 160A returns a failure code, the container 160A is considered to be broken or dead (e.g., application instance 170A running in container 160A is not functioning properly). Additionally, a healthy container 160A and application instance 170A may return a value within a range. For example, a return code between 200 and 400 may be considered a healthy container 160A, while any code outside that range (e.g., 100, 600, 650) may indicate a failure of the application instance 170A. Additionally, liveness probes may use a TCP socket, which may attempt to open a socket to a container 160A on a specified port.

The orchestrator 180 may coordinate the deployment of containers 160A-F. In an example, the orchestrator 180 may be a server. Additionally, the orchestrator 180 may be equipped with scheduler 190. In an example, the scheduler 190 may be an add-on scheduler. The orchestrator 180 may determine the timing of container 160 creation. For example, the orchestrator 180 may dictate the order of container 160 creation based on an order of dependencies. Additionally, orchestrator 180 may coordinate container 160 configuration to enable containers 160A-F to communicate with one another. For example, orchestrator 180 may pass runtime properties between containers 160. In an example, the orchestrator 180 may include a controller 184, which may be an add-on controller.

Controller 184 may run on the orchestrator 180. Additionally, controller 184 may be responsible for scaling-up and scaling-down applications 170. For example, controller 184 may measure the quantity of application instances (e.g., Applications 170A-D) running on a cluster (e.g., cluster 104A and/or cluster 104B). The controller 184 may directly or indirectly remove application instances. For example, controller 184 may delete pods and/or containers 160 from a database, which is watched by nodes 110A-B and/or cluster(s) 104A. Then, the nodes 110A-B and/or cluster(s) 104A may kill or terminate pods/and or containers 160A-D running application instances 170A-D that have been removed from the database such that the cluster 104A synchronizes with the configuration established in the database. Additionally, application instances 170A-D may be added to the database by controller 184, and cluster(s) 104A and/or nodes 110A-B may start additional containers 160A-D running application instances based on the information in the database. In another example, controller 184 may instruct a cluster 104A and/or node 110A-D to kill a container (e.g., container 160D) running an application instance (e.g., application 170D).

Scaling may also be achieved by using a binary search or a half-interval search to optimize the number of running instances 170A-D of an application 170. For example, the binary search may find the target value (e.g., quantity of application instances) by testing whether the application 170 functions properly after continuously eliminating half of the application instances (e.g., 170C-D) until the target value is reached. For example, by testing the application functionality using the median quantity of running instances (in this example, 2 running instances), the binary search can determine which half or bisection of running instances, such as below median (e.g., 0 to 2 instances) or above median (e.g., 3 to 4 instances), the application 170 retains proper functionality on. The half which the target value cannot live (e.g., the application 170 can no longer run) is eliminated and the search continues on the remaining half until it is successful. For example, the remaining half may be bisected again to eliminate another half (e.g., a quarter of the original running instances) of the remaining running instances. In another example, fractional cascading may be used to optimize several applications at once. For example, several applications 170 may be optimized simultaneously before migration.

Using an application 170 with 16 running instances as an example, the application 170 may be scaled-down to 8 instances (e.g., to test functionality of the bottom half or bisection such as instances 1 to 8). If the application 170 does not run, then the bottom half or bisection (e.g., instances 1 to 8) is eliminated as a potential target value. Then, 13 instances may be tested. For example, after instances 1 to 8 have been removed from the pool of potential target values, instances 9 to 16 remain, and a target value of 13 can be tested to split the remaining application instances into a new top half (e.g., 13 to 16) and a new bottom half (e.g., 9 to 12). If the application 170 runs then it is determined that the target value is somewhere in the bottom half (e.g., between 9 and 12). Next, a target value using 11 instances may be tested and if the application 170 does not run, 9 to 11 (e.g., the updated bottom half) may be eliminated as a potential target value. Lastly, 12 may be tested to determine if the application is capable of running with only 12 application instances. If the application 170 runs at 12 instances, then 12 is the target value. Otherwise, if the application fails using 12 instances, then 11 instances is the optimized target value.

In the example above, each instance of an application 170 may run in a respective container 160. For example, an application 170 running 16 instances may be running on 16 containers 160, with each container 160 running an instance of the application 170. After each iteration of scaling-down, a vitality metric may be re-measured and assigned to the application 170.

In another example, scaling-up or scaling-down the application 170 may include adjusting disk space allocated to the application 170. For example, the disk space allocated to each application instance may be reduced when scaling-down. Additionally, scaling-up or scaling-down may include adjusting CPU capacity available to the application 170, adjusting memory available to the application 170, or the like.

Scheduler 190 may dispatch containers 160A-F coordinated by orchestrator 180 on clusters 104A-B. Scheduler 190 may be a monolithic scheduler that handles all scheduling requests, a two-level scheduler that adjusts allocation of resources to each scheduler dynamically, or a shared-state scheduler. A shared-state scheduler may have multiple scheduling components with full access to the entire cluster of resources. In an example, scheduler 190 may be a cluster scheduler that uses placement constraints and schedules applications. Additionally, scheduler 190 may schedule applications rapidly to avoid applications 170 or containers 160 from sitting in a pending state.

Each node 110A-D may in turn include one or more physical processors (e.g., CPU 120A-F) communicatively coupled to memory devices (e.g., MD 130A-F) and input/output devices (e.g., I/O 140A-D). As used herein, physical processor or processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-F refers to a volatile or non-volatile memory device, such as RAM, ROM, EEPROM, or any other device capable of storing data. As discussed herein, I/O device 140A-D refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node, including the connections between a processor 120A-F and a memory device 130A-F may be provided by one or more local buses of suitable architecture, for example, peripheral component interconnect (PCI).

Figure 2:
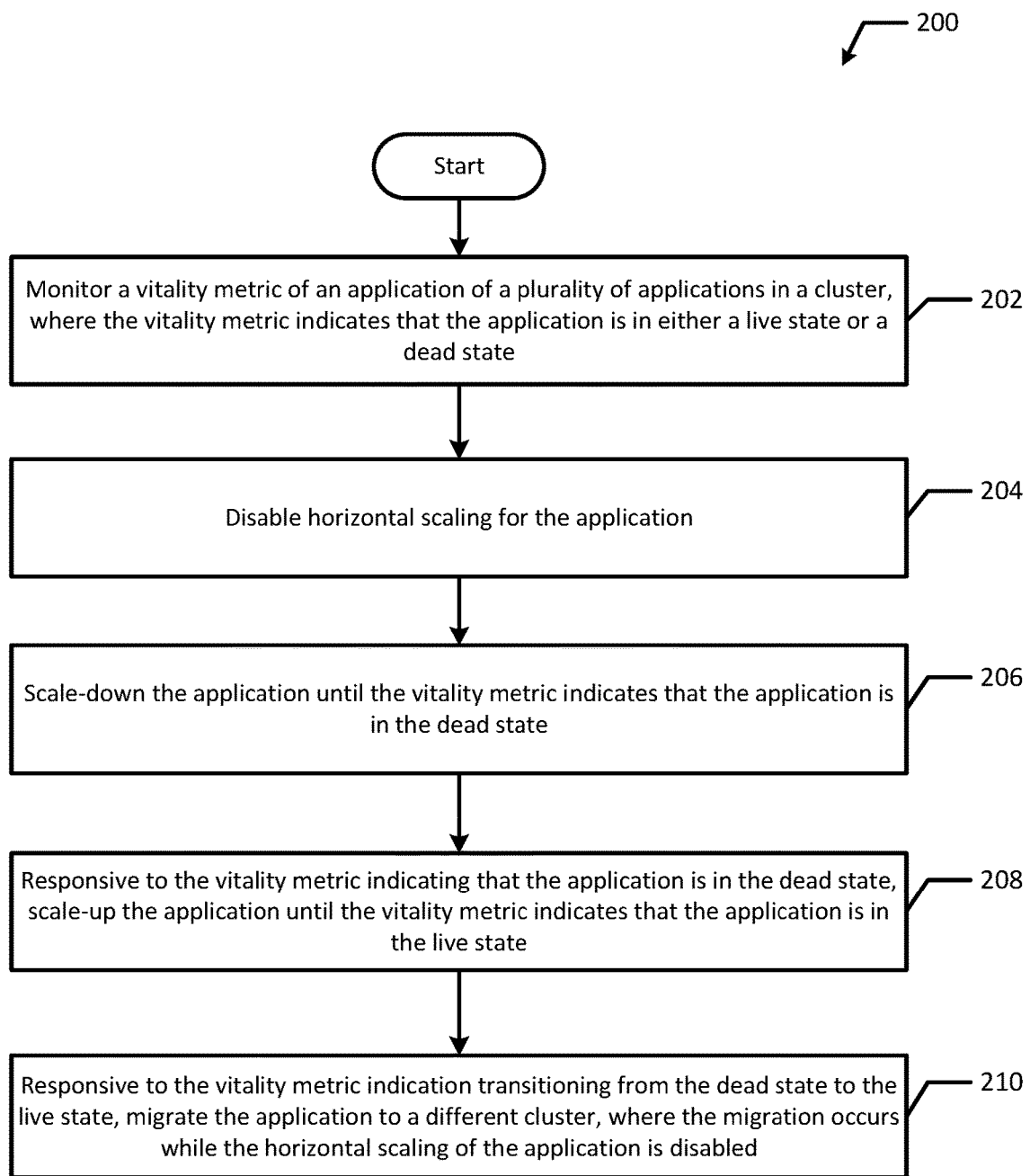
FIG. 2 illustrates a flowchart of an example process for merging container clusters according to an example embodiment of the present disclosure.

FIG. 2 illustrates a flowchart of an example method 200 for merging container clusters in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes monitoring a vitality metric of an application of a plurality of applications in a cluster, where the vitality metric indicates that the application is in either a live state or a dead state (block 202). For example, each container 160A-D may measure liveness of their respective application instance 170A-D, which may be used to determine the vitality metric of the application 170 collectively. In an example, if one or more containers 160A-D results in a liveness measurement that indicates the container is not functioning properly, the vitality metric may indicate that the application 170 is in a dead state. However, if each liveness check indicates that the containers 160A-D and application instances 170A-D are alive and healthy, the vitality metric may indicate that the application 170 is in a live state. At some point during the optimization process, horizontal scaling for the application is disabled (block 204). For example, horizontal scaling for the application 170 may be disabled to ensure that additional application instances (e.g., application 170E-F) are not added during a migration process. In an example, scaling may be disabled by editing a container 160 or pod file to turn off horizontal scaling. For example, with horizontal scaling enabled, containers 160 and application instances may auto-scale using a replication controller, which may disrupt the optimization process, which is discussed in more detail below.

Then, the application is scaled-down until the vitality metric indicates that the application is in the dead state (block 206). For example, instances of an application 170 are deleted (e.g., containers 160 are killed) to scale-down the application. In an example, application 170 may include 4 instances (e.g., application instances 170A-D running in containers 160A-D respectively) and to scale down the application 170, application instances 170C-D may be removed by killing containers 160C-D. When application instances (e.g., 170C-D) are removed, the application 170 as a whole may have a vitality metric that indicates the application is in the dead state. For example, one or more of containers 160A-B may return a liveness measurement that indicates the container is not functioning properly. As discussed above, liveness probes may be conducted every few seconds. In an example, liveness may be determined using an average or tally for liveness measurements. For example, liveness probes may run every 3 seconds for 30 seconds and if more than two of the probes result in a problematic reading (e.g., non-zero reading), then the application instance and respective container 160 may be deemed to be problematic. Various other averaging and threshold techniques may be used to quantify liveness for an application instance running in a container 160.

Responsive to the vitality metric indicating that the application is in the dead state, the application is scaled-up until the vitality metric indicates that the application is in the live state (block 208). For example, to find the optimum quantity of application instances running on a node cluster 104 that enables the application 170 to function properly, controller 184 may scale-up application 170. For example, as discussed above, controller 184 may add application instances to a database, which may be watched by nodes 110 and or node cluster(s) 104. The node cluster(s) 104 then may start running additional containers 160 with application instances to match the configuration in the database. In an example, application 170 may now include 2 instances (e.g., application instances 170A-B running in containers 160A-B respectively) and to scale-up the application 170, application instance 170C may be added by starting or restarting container 160C. When application instance(s) (e.g., 170C) are added, the application 170 as a whole may have a vitality metric that indicates the application 170 is in the live state. For example, each container 160A-C may return a liveness measurement that indicates the containers 160A-C and the application instances 170A-C running within the containers 160A-C are functioning properly.

Responsive to the vitality metric indication transitioning from the dead state to the live state, the application is migrated to a different cluster, where the migration occurs while the horizontal scaling of the application is disabled (block 210). For example, by the liveness metric indication transitioning from the dead state to the live state, an optimized quantity of application instances may be achieved. Additionally, this transition may occur several times in an optimization. For example, an application 170 may be optimized using various optimization intervals, such as optimizing by every 2 instances or the application 170 may be optimized to a single application instance unit. By transitioning from the dead state to the live state, the vitality metric indicates that the current quantity of application instances enables the application 170 to run smoothly, while the last vitality check with fewer application instances resulted in an application 170 that did not run correctly (e.g., the quantity of application instances was insufficient to support the application 170 as a whole). Once the application 170 is optimized, the application 170 may be migrated to the new cluster 104B while horizontal scaling is disabled, which advantageously saves time and resources my limiting the quantity of application instances that are migrated to the new cluster. Additionally, by migrating with horizontal scaling disabled, applications 170 on the new cluster 140B do not scale until each application 170 has been migrated, which advantageously prevents applications 170 (e.g., a first application 170 migrated to the new cluster) from over scaling on the new cluster 104B. For example, if the first application 170 is migrated with horizontal scaling enabled, the first application 170 may over-scale and consume disk space and/or CPU capacity that is needed for other applications that have yet to be migrated.

Figure 3A:
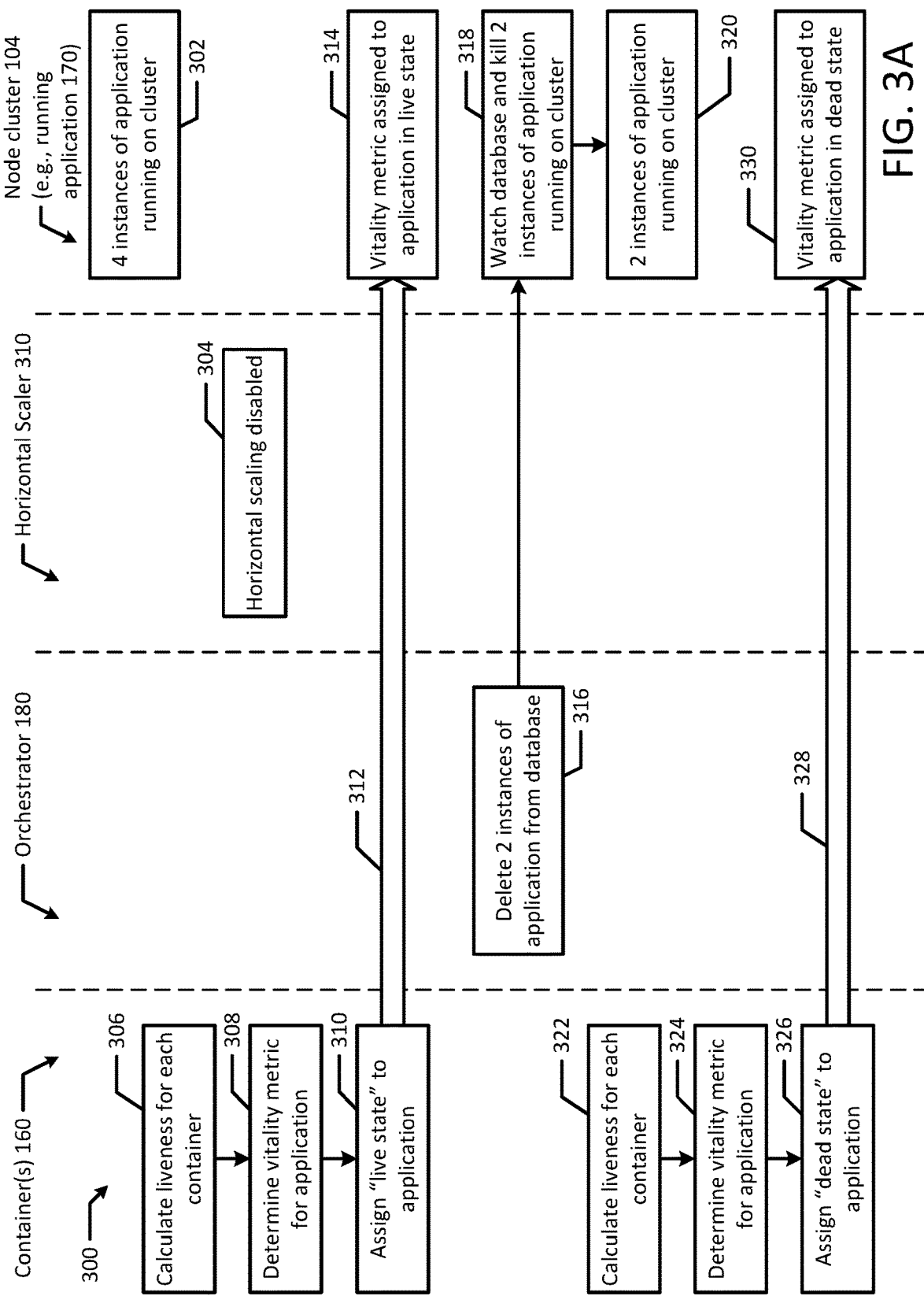
FIGS. 3A and 3B illustrate a flow diagram of an example process for merging container clusters according to an example embodiment of the present disclosure.
Figure 3B:
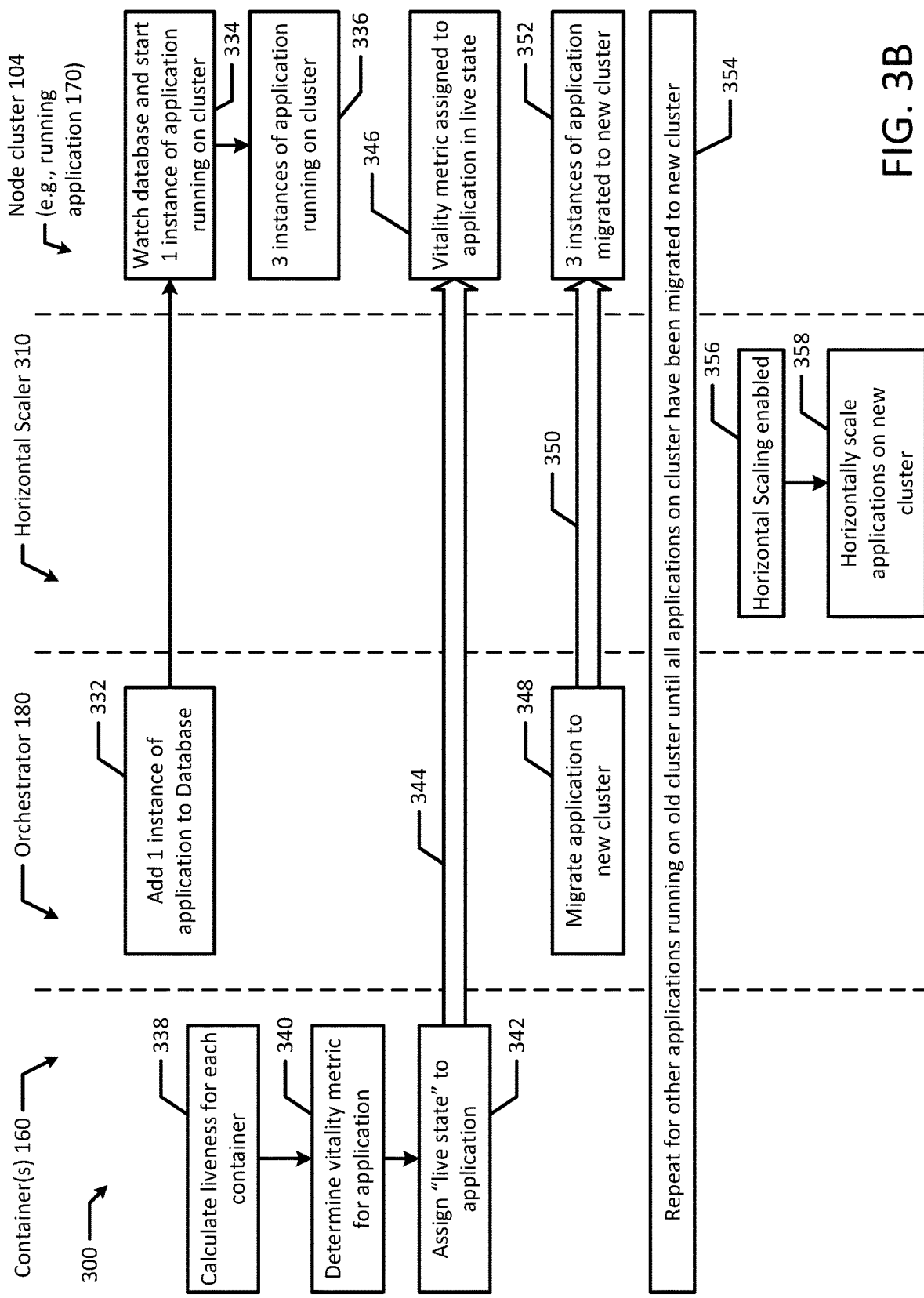

FIGS. 3A and 3B illustrate a flowchart of an example method 300 for merging container clusters. Although the example method 300 is described with reference to the flowcharts illustrated in FIGS. 3A and 3B, it will be appreciated that many other methods of performing the acts associated with the method 300 may be used. For example, the order of some of the blocks may be changed, certain blocks may be combined with other blocks, and some of the blocks described are optional. The method 300 may be performed by various containers 160, an orchestrator 180, a horizontal scaler 310, and a node cluster 104 running application 170, which may communicate to perform example method 300.

In the illustrated example, application 170 may have 4 instances running on a cluster 104 (block 302). For example, 4 instances of application 170 (e.g., applications 170A-D) may each be running in a respective container (e.g., containers 160A-D) on cluster 104A (e.g., nodes 110A-B). Before attempting a scaled-down migration, horizontal scaler 310 may disable horizontal scaling for application 170 (block 304). In an example, horizontal scaler 310 may be an API resource, such as an auto-scaler. Additionally, horizontal scaler 310 may be a process that edits a pod or container 160 configuration to disable horizontal scaling for applications 170. By disabling horizontal scaling, the application 170 is advantageously prevented from adding application instances while the optimization process takes place. Additionally, after an application is optimized, horizontal scaling may add instances of that application while other optimization (e.g., optimization of other applications) is taking place, thereby negating the benefit of the original optimization.

Container(s) 160A-D calculate liveness for each container associated with the application instances 170A-D (block 306). For example, container 160A may calculate liveness for application instance 170A. Additionally, container 160B may calculate liveness for application instance 170B, and so forth for containers 160C-D and application instances 170C-D respectively. Then, a vitality metric for the application 170 is determined (block 308). For example, each application instance 170A-D may result in a passing liveness test, thereby indicating that the application as a whole (e.g., all of the application instances collectively) is in a live state. Then, the container(s) 160A-D may indicate that the application 170 as a whole is in a live state (blocks 310 and 312). For example, an application 170 may be considered to be in a live state if each application instance 170C-D is running properly and passes its liveness probe. Then, the application 170 has a vitality metric in the "live state" assigned to it (block 314). For example, the vitality metric indications may be stored in a database or output log in memory (e.g., MD 130A-C) on nodes 110A-B in node cluster 104A.

To determine how much an application can be appropriately scaled-down, an orchestrator 180 may delete instances of the application 170. As discussed above, one such method of determining the optimum number of application instances is by using a binary search. Since application 170 has 4 instances (e.g., application instances 170A-D) running on a cluster 104A, the orchestrator may delete 2 instances from a database (block 316). In an example, controller 184 may delete application instances. For example, controller 184 running on orchestrator 180 may reduce the quantity of application instances by writing in a database such that application 170 corresponds to 2 running instances in the database, which may result in the respective containers 160C-D being killed on the node cluster 104A. In the illustrated example, node cluster 104A watches the database and kills 2 instances of the application 170 (e.g., application instance 170C-D) running on cluster 104A (block 318). For example, the node cluster 104A may kill containers 160C-D to synchronize the number of application instances (e.g., a total of 2 instances, such as applications 170A-B) running on the cluster 104A with the quantity specified in the database. Then, application 170 has 2 instances (e.g., application 170A-B) running on the cluster 104A (block 320). For example, after killing two containers 160C-D and therefore two application instances 170C-D, application 170 has two remaining instances running on the cluster 104A.

After scaling-down the application 170, the container(s) 160A-B calculate liveness for each container 160A-B associated with the application instances 170A-B (block 322). For example, container 160A may calculate liveness for application instance 170A. Additionally, container 160B may calculate liveness for application instance 170B. Then, a new vitality metric for the application 170 is determined (block 324). For example one or more application instances 170A-B may result in a failing liveness test, thereby indicating that the application 170 as a whole (e.g., all of the application instances collectively) is in a dead state. Then, the container(s) 160A-B may indicate that the application 170 as a whole is in a dead state (blocks 326 and 328). For example, one or more of the liveness probes on containers 160A-B may indicate that the container (e.g., container 160B) and associated application instance 170B is not alive and well (e.g., broken, frozen, dead). Then, the application 170 has a vitality metric in the "dead state" assigned to it (block 330). For example, a vitality metric may be stored in a log or database to indicate that the application is in a dead state when two application instances 170A-B are running.

Continuing with the binary search approach, the orchestrator 180 may scale-up the application 170 to determine the minimum number of application instances that enable application 170 to function properly. In the illustrated example, orchestrator 180 adds 1 instance of the application 170 to the database (block 332). For example, as described above, controller 184 may edit the database to indicate that another application instance should be added to cluster 104A. Node cluster 104A watches the database and adds 1 instance of the application (e.g., application instance 170C) to start running on cluster 104A (block 334). For example, the node cluster 104A may add containers 160 to synchronize the number of application instances running on the cluster 104A with the quantity specified in the database. Then, application 170 has 3 instances running on the cluster 104A (block 336). For example, after adding 1 container 160C and therefore 1 application instance 170C, application 170 has 3 instances (e.g., application instances 170A-C) running on the cluster 104A.

After scaling-up the application 170, the container(s) 160A-C calculate liveness for each container associated with the application instances 170A-C (block 338). For example, containers 160A-C may calculate liveness for application instances 170A-C respectively. Then, a new vitality metric for the application 170 is determined (block 340). For example, each application instance 170A-C may result in a passing liveness test, thereby indicating that the application 170 as a whole (e.g., all of the application instances 170A-C collectively) is in a live state. Then, the container(s) 160A-C may indicate that the application 170 as a whole is in a live state (blocks 342 and 344). For example, each of the liveness probes on containers 160A-C may indicate that the containers 160A-C and associated application instances 170A-C are alive and well. Then, the application 170 has a vitality metric in the "live state" assigned to it (block 346). For example, the vitality metric may be rewritten in the log or database to indicate that the application is in a live state when 3 application instances are running.

Since the application functioned properly (e.g., vitality metric indicated a live state) with 3 application instances (e.g., application 170A-C) running on the cluster 104A, but the application did not function properly with 2 application instances (e.g., applications 170A-B) running on the cluster 104A, the optimum quantity of application instances for application 170 is determined to be 3 application instances. After the optimum number of application instances is determined, the orchestrator 180 migrates application 170 (e.g., 3 instances of application 170) to a new cluster 104B (blocks 348 and 350). For example, the 3 application instances are migrated to the new cluster 104B by migrating their respective containers 160A-C to the new cluster 104B. In an example, 3 new containers (e.g., 160D-F) may be started on the new cluster 104B that run the 3 respective application instances, which may be new instances. Then, 3 instances of application 170 are migrated to the new cluster 104B (block 352). For example, the application 170 is migrated to the new cluster 104B while horizontal scaling is disabled to ensure that the new cluster 104B naturally rebalances after all applications are migrated, thereby allowing the new cluster utilization to be optimized to its practical maximum value.

Next, the above discussed blocks 306 to 352 are repeated for other applications running on cluster 104A until all applications on cluster 104A have been migrated to the new cluster 104B (block 354). In an example, an application with 12 instances may have vitality monitored at 12, 6, 9, and 8 application instances before migration. For example, using binary search, vitality metrics may be determined for 12 application instances (e.g., live state), 6 application instances (e.g., dead state), 9 application instances (e.g., live state), and 8 application instances (e.g., dead state), which indicates that 9 application instances is the minimum number of application instances that enables the application to run properly. Then, the 9 application instances of the application will also be migrated to the new cluster 104B with horizontal scaling for that application turned off (e.g., new cluster 104B has 3 application instances of application 170 and the 9 application instances described above).

After each application on the old cluster 104A has been migrated to the new cluster 104B, horizontal scaling is enabled on each application 170 (block 356). In an example, horizontal scaler 310, such as an auto-scaling API resource may edit each container configuration to enable horizontal scaling for applications 170. By enabling horizontal scaling, the application 170 is advantageously enabled to scale on the new cluster 104B to naturally rebalance container distribution. Then, the horizontal scaler 310 scales each application 170 on the new cluster 104B (block 358). For example, the containers 160 are scaled to adjust for workload demands based on the architecture of the new cluster 104B. Some applications 170 may run more effectively on the new cluster and may require less horizontal scaling than other applications after migration, which may allow for more applications to run on the new cluster with a higher application density that would not have been achieved if the applications were not scaled-down prior to migration as discussed herein. By horizontally scaling applications 170 on the new cluster after all applications have been migrated, utilization of the new cluster 104B is increased and optimized to its practical maximum.

Figure 4:
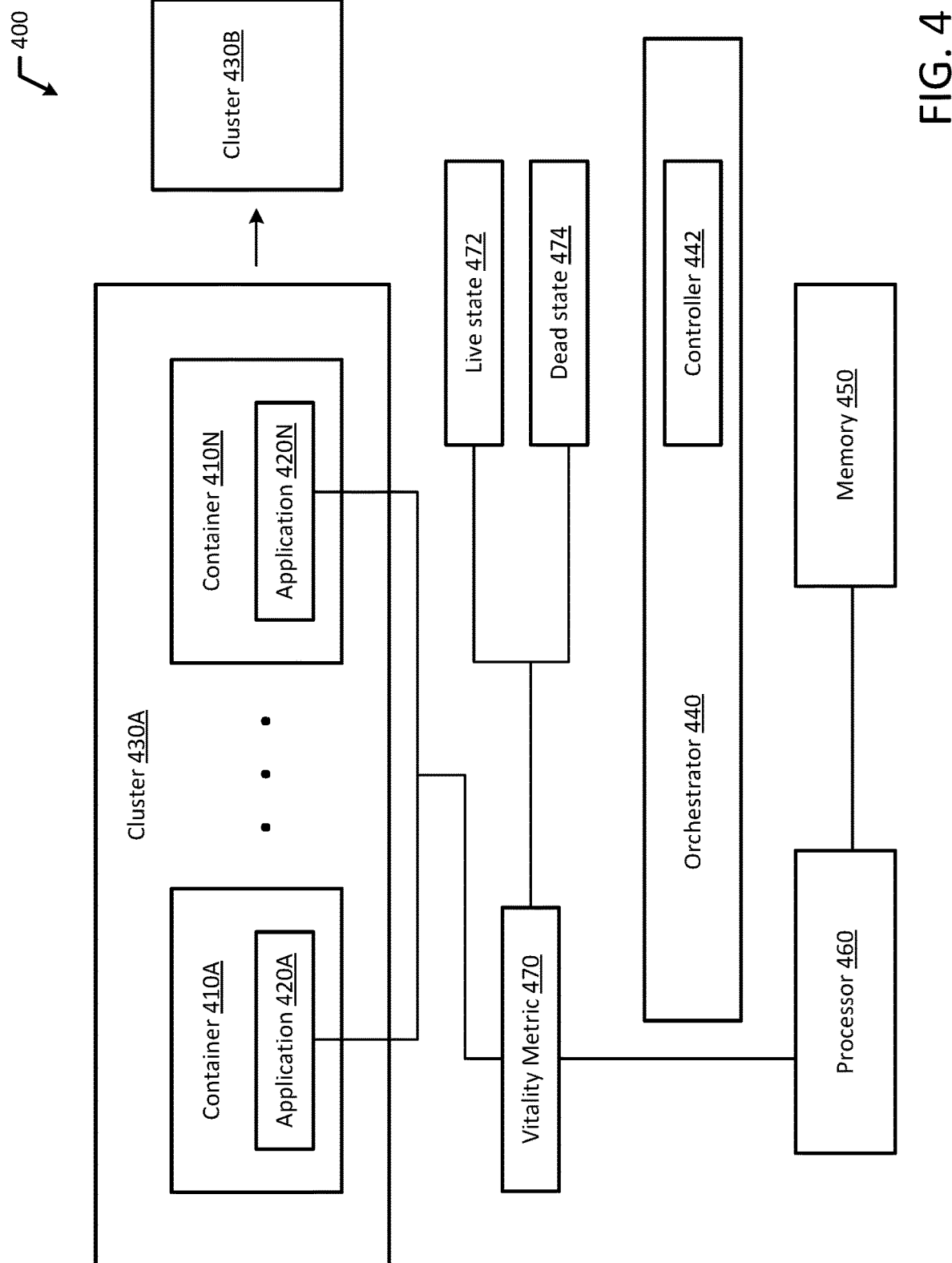
FIG. 4 illustrates a block diagram of an example container system for merging container clusters according to an example embodiment of the present disclosure.

FIG. 4 is a block diagram of an example system 400 for merging container clusters according to an example embodiment of the present disclosure. The system 400 for may include a plurality of containers 410A-N running one or more instances of an application 420 (e.g., application instances 420A-N) running on a cluster 430A. Additionally, system 400 may include an orchestrator 440 with a controller 442, a memory 450, and a processor 460 in communication with the memory 450. Additionally, the processor 460 may execute to monitor a vitality metric 470 of the application 420 in the cluster 430A. The vitality metric 470 indicates that the application 420 is in either a live state 472 or a dead state 474. Additionally, the processor 460 may execute to disable horizontal scaling for the application 420 and scale-down the application 420 until the vitality metric 470 indicates that the application 420 is in the dead state 474. Responsive to the vitality metric 420 indicating that the application 420 is in the dead state 474, the processor 460 may execute to scale-up the application 420 until the vitality metric 470 indicates that the application 420 is in the live state 472. Additionally, responsive to the vitality metric 470 indication transitioning from the dead state 474 to the live state 472, the processor 460 may execute to migrate the application 420 to a different cluster 430B. The migration occurs while the horizontal scaling of the application 420 is disabled.

The systems and methods disclosed herein are inextricably tied to and provide an improvement to computer application migration technology. For example, by optimizing applications 170 before container 160 migration (e.g., determining a minimum number of application instances that enable an application 170 to run properly), typically less containers 160 are migrated to a new cluster 104, thereby reducing time and computation resources used during the migration. The solution described herein is necessarily rooted in computer technology to overcome a problem specifically arising in the realm of computer networks, and more specifically to cloud computing migration, by addressing the challenge of migrating containers 160 to a new cluster 104, such as a new datacenter. For example, the controller 184 scales applications 170 up and down while containers 160 monitor the vitality metric of each application in order to determine the optimum quantity of application instances to be migrated, which is typically a reduced quantity than what was originally running on the cluster 104. Thus, the present disclosure provides a particular way to address a problem and improve upon the existing technological processes for migrating containers 160 to new clusters 104 in cloud environments, which results in reducing the time and overhead associated with migrating every application instance from the disclosed unconventional manner of migrating containers 160. The disclosed systems and methods improve the distribution of containers 160 on computer hardware (e.g., node clusters 104) to allow for container 160 consolidation and a performance of hardware utilization not previously performable.

By scaling applications 170 up and down and monitoring the vitality metric of those applications 170, the systems and methods disclosed herein offers the benefit of optimizing applications 170 prior to migration, which is a technology-based solution that overcomes the disadvantages of migrating containers 160 according to generic and conventional methods. The scheduler 190 and controller 184 executing on a processor (e.g., CPU 120) acts in concert with containers 160 and node clusters 104 to provide a non-conventional and non-generic arrangement that improve existing container migration techniques to reduce the time and resources used during a migration to a new node cluster 104, and also synergystically enable containers 160 to be consolidated on fewer hardware resources, thereby increasing the utilization rate of physical processors for running container applications 170 and reducing overhead.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a plurality of containers running one or more instances of an application, wherein the application runs on a cluster; and
a processor in communication with a memory configured to:
scale-down the application until a vitality metric indicates that the application is in a dead state;
responsive to the vitality metric indicating that the application is in the dead state, scale-up the application until the vitality metric indicates that the application is in a live state; and
responsive to the vitality metric indication transitioning from the dead state to the live state, migrate the application to a different cluster while horizontal scaling of the application is disabled.

2. The system of claim 1, further comprising an orchestrator with a controller, and wherein the processor is configured to cause the controller to scale-up and scale-down the application.

3. The system of claim 2, wherein the controller scales-down the application by deleting application instances from a database, and the cluster watches the database to kill an application instance that has been deleted from the database.

4. The system of claim 1, wherein a binary search is utilized in scaling-down and scaling-up the application to obtain an optimum vitality metric for the application.

5. The system of claim 1, wherein scaling-down the application includes reducing a quantity of application instances of the application.

6. The system of claim 1, wherein scaling-up the application includes increasing a quantity of application instances of the application.

7. The system of claim 1, wherein scaling-down and scaling-up the application includes at least one of adjusting disk space allocated to the application, adjusting CPU capacity available to the application, and adjusting memory available to the application.

8. A method comprising:
scaling-down, by a controller, an application until a vitality metric indicates that the application is in a dead state;
responsive to the vitality metric indicating that the application is in the dead state, scaling-up, by the controller, the application until the vitality metric indicates that the application is in a live state; and
responsive to the vitality metric indication transitioning from the dead state to the live state, migrating the application to a different cluster while horizontal scaling of the application is disabled.

9. The method of claim 8, wherein the application is one of a plurality of applications in a cluster, the method further comprising:
migrating a different application from the plurality of applications in the cluster to the different cluster;
responsive to migrating the plurality of applications in the cluster to the different cluster, enabling horizontal scaling for the plurality of applications; and
horizontally scaling the plurality of applications.

10. The method of claim 8, wherein the controller scales-down the application by deleting application instances from a database.

11. The method of claim 8, wherein a binary search is utilized in scaling-down and scaling-up the application to obtain an optimum vitality metric for the application.

12. The method of claim 8, wherein scaling-down the application includes reducing a quantity of application instances of the application.

13. The method of claim 8, wherein scaling-up the application includes increasing a quantity of application instances of the application.

14. The method of claim 8, wherein scaling-down and scaling-up the application includes at least one of adjusting disk space allocated to the application, adjusting CPU capacity available to the application, and adjusting memory available to the application.

15. A non-transitory machine-readable medium storing code, which when executed by a processor, is configured to:
scale-down an application until a vitality metric indicates that the application is in a dead state;
responsive to the vitality metric indicating that the application is in the dead state, scale-up the application until the vitality metric indicates that the application is in a live state; and
responsive to the vitality metric indication transitioning from the dead state to the live state, migrate the application to a different cluster while horizontal scaling of the application is disabled.

16. The non-transitory machine-readable medium of claim 15, wherein the processor is further configured to:
migrate a different application from a plurality of applications in a cluster to the different cluster;
responsive to migrating the plurality of applications in the cluster to the different cluster, enable horizontal scaling for the plurality of applications; and
horizontally scale the plurality of applications.

17. The non-transitory machine-readable medium of claim 15, wherein a binary search is utilized in scaling-down and scaling-up the application to obtain an optimum vitality metric for the application.

18. The non-transitory machine-readable medium of claim 15, wherein scaling-down the application includes reducing a quantity of application instances of the application.

19. The non-transitory machine-readable medium of claim 15, wherein scaling-up the application includes increasing a quantity of application instances of the application.

20. The non-transitory machine-readable medium of claim 15, wherein scaling-down and scaling-up the application includes at least one of adjusting disk space allocated to the application, adjusting CPU capacity available to the application, and adjusting memory available to the application.

* * * * *